(12) United States Patent
Chen et al.

(10) Patent No.: US 10,292,236 B2
(45) Date of Patent: May 14, 2019

(54) LINEAR CONSTANT CURRENT LED DRIVE DEVICE CAPABLE OF DRIVING REDUCED NUMBER OF LEDS

(71) Applicant: Shenzhen Sendis Semiconductor Co., LTD, Shenzhen (CN)

(72) Inventors: Xiaoyu Chen, Shenzhen (CN); Bo Chen, Shenzhen (CN); Xunsheng Deng, Shenzhen (CN); Yanquan Mai, Shenzhen (CN)

(73) Assignee: SHENZHEN SENDIS SEMICONDUCTOR CO., LTD, Shenzhen (CN)

( * ) Notice: Subject to any disclaimer, the term of this patent is extended or adjusted under 35 U.S.C. 154(b) by 0 days.

(21) Appl. No.: 15/571,204

(22) PCT Filed: Apr. 7, 2016

(86) PCT No.: PCT/CN2016/078732
§ 371 (c)(1),
(2) Date: Nov. 1, 2017

(87) PCT Pub. No.: WO2016/202061
PCT Pub. Date: Dec. 22, 2016

(65) Prior Publication Data
US 2018/0270930 A1    Sep. 20, 2018

(30) Foreign Application Priority Data
Jun. 18, 2015  (CN) .......................... 2015 1 0339514

(51) Int. Cl.
*H05B 37/02* (2006.01)
*H05B 33/08* (2006.01)

(52) U.S. Cl.
CPC ......... *H05B 37/02* (2013.01); *H05B 33/0806* (2013.01); *H05B 33/0809* (2013.01);
(Continued)

(58) Field of Classification Search
CPC .......................... H05B 33/08; H05B 33/0803; H05B 33/0806; H05B 33/0809; H05B 33/0812;
(Continued)

(56) References Cited

U.S. PATENT DOCUMENTS 8,344,638 B2 * 1/2013 Shteynberg ........ H05B 33/0815
315/185 S
8,890,441 B2 * 11/2014 Sawada ................. H02M 3/157
315/209 R
(Continued)

FOREIGN PATENT DOCUMENTS

CN  202206597 U  4/2012
CN  102917194 A  2/2013
(Continued)

*Primary Examiner* — Tung X Le
*Assistant Examiner* — Borna Alaeddini
(74) *Attorney, Agent, or Firm* — Anova Law Group, PLLC (57) ABSTRACT

A linear constant current LED drive device capable of driving reduced number of LEDs, comprises: a rectifier module, an energy storage component, a switch module, a constant current supply module, a measurement module and a control module. When voltage differences between two ends of both switch module and constant current supply module are less than according threshold voltages, control module turns on switch module, enabling rectifier module to charge energy storage component and LED string lights. When voltage difference between two ends of either switch module or constant current supply module exceeds according threshold voltage, control module turns off switch module, enabling energy storage component to charge LED string lights. So rectifier module and energy storage component supply electricity to plurality of LED string lights alternately, number of LEDs can be reduced, while maintaining high drive efficiency.

10 Claims, 8 Drawing Sheets

(52) U.S. Cl.
CPC ......... *H05B 33/0812* (2013.01); *H05B 33/08* (2013.01); *H05B 33/0803* (2013.01)

(58) Field of Classification Search
CPC ............ H05B 33/0842; H05B 33/0845; H05B 33/0848; H05B 33/0851; H05B 33/0884; H05B 33/0887; H05B 33/089
See application file for complete search history.

(56) References Cited

U.S. PATENT DOCUMENTS

| | | | | |
|---|---|---|---|---|
| 9,113,521 | B2* | 8/2015 | Gredler | H05B 33/0815 |
| 9,246,403 | B2* | 1/2016 | Siessegger | H05B 33/0806 |
| 9,247,608 | B2* | 1/2016 | Chitta | H02M 1/08 |
| 9,554,428 | B2* | 1/2017 | Hsu | H05B 33/0812 |
| 9,736,893 | B2* | 8/2017 | Knoedgen | H05B 33/0842 |
| 9,791,110 | B2* | 10/2017 | Hu | F21K 9/64 |
| 9,872,349 | B2* | 1/2018 | Eum | H05B 33/0812 |
| 2013/0181626 | A1 | 7/2013 | Chen | |
| 2013/0293139 | A1* | 11/2013 | Sadwick | H05B 37/02 315/224 |
| 2013/0342126 | A1 | 12/2013 | Johnson | |
| 2014/0111093 | A1 | 4/2014 | Sun et al. | |
| 2014/0265892 | A1 | 9/2014 | Chang et al. | |

FOREIGN PATENT DOCUMENTS

| | | |
|---|---|---|
| CN | 103999548 A | 8/2014 |
| CN | 104333940 A | 2/2015 |
| CN | 104640268 A | 5/2015 |
| CN | 104981060 A | 10/2015 |
| CN | 204859619 U | 12/2015 |
| EP | 2824997 A1 | 1/2015 |

* cited by examiner

LINEAR CONSTANT CURRENT LED DRIVE DEVICE CAPABLE OF DRIVING REDUCED NUMBER OF LEDS

CROSS-REFERENCES TO RELATED APPLICATIONS

This application is a national stage application of PCT Patent Application No. PCT/CN 2016/078732, filed on Apr. 7, 2016, which claims priority to Chinese Patent Application No. 201510339514.4, filed on Jun. 18, 2015, the content of all of which is incorporated herein by reference.

FIELD OF THE INVENTION

The present invention relates to the field of LED (Light Emitting Diode) driver technology, and, more particularly, to a linear constant current LED drive device capable of driving reduced number of LEDs.

BACKGROUND

Figure 1:
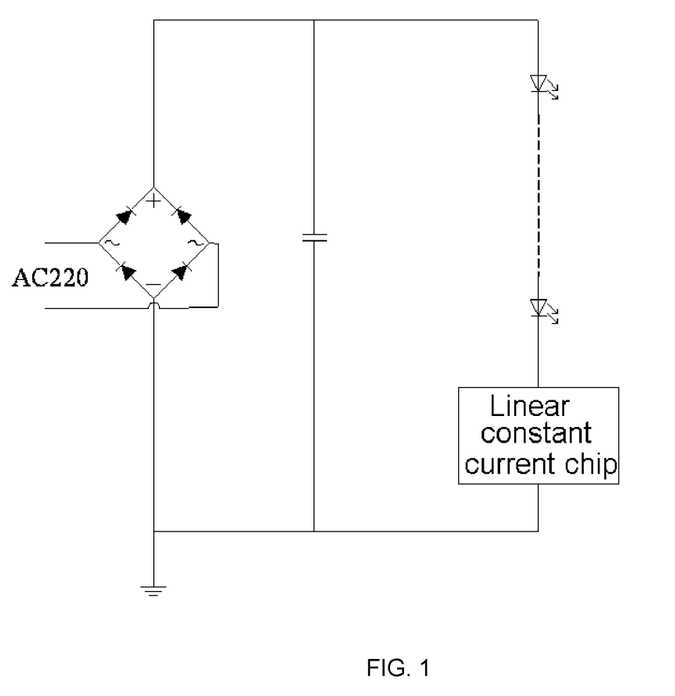
FIG. 1 illustrates an application circuit of a linear constant current chip in the prior art.
Figure 2:
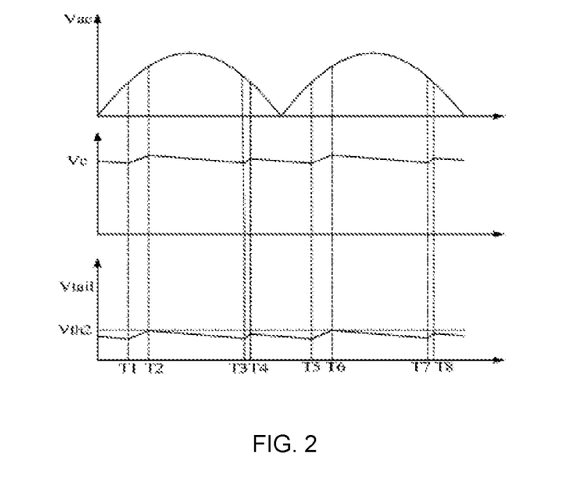
FIG. 2 illustrates a waveform during a working process of an application circuit of a linear constant current chip in the prior art.

FIG. 1 and FIG. 2 are an application circuit diagram of an existing linear constant current chip and a waveform graph of a working process thereof. A maximum voltage of a capacitor is a maximum output voltage of a rectifier bridge, and a minimum value exceeds a sum of a plurality of VF (Forward Voltage) values of LEDs in a plurality of LED string lights, which therefore requires a higher number of LEDs, and usually it requires about 80 LEDs for an application in 220V. When an input voltage rises/lowers, the voltage of the capacitor will also increase/decrease accordingly, in such a way, an efficiency of a system will change following a change of an input voltage. When the input voltage is very high, a power consumption of the chip will rise sharply, and both stability and reliability of the system will become worse.

Therefore, the current technology needs to be improved and developed.

BRIEF SUMMARY OF THE DISCLOSURE

According to the above described defects, the purpose of the present invention is providing a linear constant current LED drive device capable of driving reduced number of LEDs, and enabling the sum of VF values of the LEDs in the plurality of LED string lights not to match the maximum value of the output voltage of the rectifier bridge any more, thus enabling the number of the LEDs to decrease greatly, while at a same time, keeping a pretty high driving efficiency.

In order to achieve the above mentioned goals, the technical solution of the present invention to solve the technical problems is as follows:

A linear constant current LED drive device capable of driving reduced number of LEDs, comprises a rectifier module, an energy storage component, a switch module, a constant current supply module, a measurement module and a control module;

the rectifier module rectifies an alternating current (AC) from an external input, and supplies power to both the energy storage component and a plurality of LED string lights; the switch module controls the energy storage component to charge and discharge and a power supply to the plurality of LED string lights through an on-off of itself; the constant current supply module keeps the current of the plurality of LED string lights constant; the measurement module measures a voltage difference between two ends of the constant current supply module, before outputting the voltage difference measured to the control module; when the voltage difference of the control module between two ends of the switch module is less than a first threshold voltage, and the voltage difference between two ends of the constant current supply module is less than a second threshold voltage, the switch module will be controlled on so as to enable the rectifier module to charge the energy storage component and supply power to the plurality of LED string lights; when the voltage difference between two ends of the switch module exceeds the first threshold voltage, or the voltage difference between two ends of the constant current supply module exceeds the second threshold voltage, the switch module is controlled off so as to enable the energy storage component to supply power to the plurality of LED string lights;

The linear constant current LED drive device capable of driving reduced number of LEDs, wherein the drive device further comprises a unidirectional conduction module, applied to a forward direction conduction to preventing a leakage of the energy storage component; the switch module connects to one end of the energy storage component and a positive electrode of the plurality of LED string lights through the unidirectional conduction module.

The linear constant current LED drive device capable of driving reduced number of LEDs, wherein the first threshold voltage is a highest voltage it may afford between two ends thereof, when the switch module is turned on.

The linear constant current LED drive device capable of driving reduced number of LEDs, wherein the control module comprises:

a level shift unit, applied to shifting a level of the voltage output by the measurement module, so that the voltage output from the measurement module is shifted to a voltage domain of the switch module;

a switch voltage measurement unit, applied to measuring the voltage difference between two ends of the switch module, and comparing the voltage difference between two ends of the switch module to the first threshold voltage;

a switch control unit, applied to controlling the switch module on so as to charge the energy storage component, when the voltage difference between two ends of the switch module is less than the first threshold voltage, and the voltage difference between two ends of the constant current supply module is less than the second threshold voltage; while controlling the switch module off so as to stop charging the energy storage component, when the voltage difference between two ends of the switch module exceeds the first threshold voltage, or the voltage difference between two ends of the constant current supply module exceeds the second threshold voltage.

The linear constant current LED drive device capable of driving reduced number of LEDs, wherein the switch module comprises a first MOS transistor, a drain electrode of the first MOS transistor connects to an output end of the rectifier module, a source electrode of the first MOS tube connects to a positive electrode of the unidirectional conduction module, a gate electrode of the first MOS transistor is an input end for a control signal of the switch module, connecting to the switch control unit.

The linear constant current LED drive device capable of driving reduced number of LEDs, wherein the level shift unit comprises a power supply, a first resistor and an inverter; a negative electrode of the power supply gets grounded, a positive electrode of the power supply connects to one end of the first resistor and a positive end of a power supply of the inverter, another end of the first resistor is an input end of the level shift unit, connecting to an output end of the measurement module and an input end of the inverter, a negative end of the power supply of the inverter gets grounded, and an output end of the inverter is an output end of the level shift unit, connecting to the gate electrode of the first MOS transistor.

The linear constant current LED drive device capable of driving reduced number of LEDs, wherein the measurement module comprises a second resistor, a third resistor, a first reference voltage source, a second MOS transistor and a comparator; one end of the second resistor is an input end of the measurement module, connecting to an input end of the constant current supply module and a negative electrode of the plurality of LED string lights, another end of the second resistor connects to an non-inverting input end of the comparator, and further gets grounded through the third resistor; a positive electrode of the first reference voltage source connects to an inverting input end of the comparator, a negative electrode of the first reference voltage source gets grounded, an output end of the comparator connects to a gate electrode of the second MOS transistor, while a source electrode of the second MOS transistor gets grounded, and a drain electrode of the second MOS transistor is an output end of the measurement module, connecting to the switch control unit.

The linear constant current LED drive device capable of driving reduced number of LEDs, wherein the constant current supply module comprises a fourth resistor, a second reference voltage source, a third MOS transistor and an operational amplifier; a drain electrode of the third MOS transistor is an input end of the constant current supply module, connecting to a negative electrode of the plurality of LED string lights outside and one end of the second resistor, a source electrode of the third MOS transistor is connected to an inverting input end of the operational amplifier and gets grounded through the fourth resistor, the positive electrode of the second reference voltage source is connected to an non-inverting input end of the operational amplifier, while a negative electrode of the second reference voltage source gets grounded.

The linear constant current LED drive device capable of driving reduced number of LEDs, wherein, the energy storage component comprises a capacitor.

The linear constant current LED drive device capable of driving reduced number of LEDs, wherein, the unidirectional conduction module includes a diode, the switch module connects to one end of the energy storage component and the positive electrode of the plurality of LED string lights through the diode.

Comparing to the prior arts, the linear constant current LED drive device capable of driving reduced number of LEDs provided by the present invention, controls the energy storage component to charge and discharge, and controls the plurality of LED string lights on and off through its own on and off; measures the voltage difference between two ends of the constant current supply module through the measurement module, and outputs the voltage difference measured to the control module; and through the control module, when the voltage difference between two ends of the switch module is less than the first threshold voltage, and the voltage difference between two ends of the constant current supply module is less than the second threshold voltage, the switch module is be controlled on to enable the rectifier module to charge the energy storage component and supply power to the plurality of LED string lights; when the voltage difference between two ends of the switch module exceeds the first threshold voltage, or the voltage difference between two ends of the constant current supply module exceeds the second threshold voltage, the switch module is controlled off so as to enable the energy storage component to stop charging, and start to supply power to the plurality of LED string lights; in this matter, the rectifier module and the energy storage component supply power to the plurality of LED string lights alternatively, as a consequence, the sum of VF values of the plurality of LED string lights does not have to match the maximum value of the output voltage of the rectifier bridge, and comparing to the prior arts, the number of LEDs in the plurality of LED string lights may be reduced greatly, owning a greater flexibility; at a same time, when the input voltage shifts, the whole drive device may still maintain a pretty high drive efficiency.

DETAILED DESCRIPTION

The present invention provides a linear constant current LED drive device capable of driving reduced number of LEDs and a LED TV set thereof. In order to make the purpose, technical solution and the advantages of the present invention clearer and more explicit, further detailed descriptions of the present invention are stated here, referencing to the attached drawings and some preferred embodiments of the present invention. It should be understood that the detailed embodiments of the invention described here are used to explain the present invention only, instead of limiting the present invention.

Figure 3:
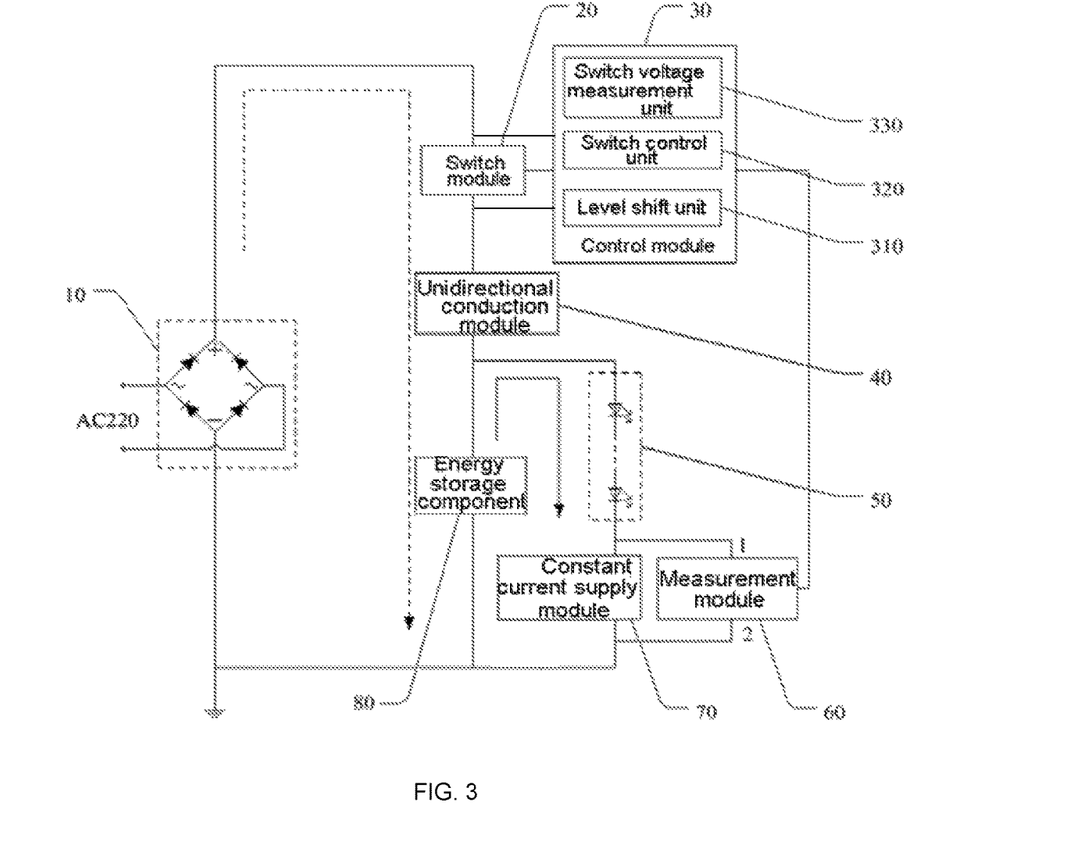
FIG. 3 illustrates a structural block diagram of a linear constant current LED drive device capable of driving reduced number of LEDs provided by the present invention.

Referencing to FIG. 3, the linear constant current LED drive device capable of driving reduced number of LEDs, comprises a rectifier module 10, a switch module 20, a control module 30, a unidirectional conduction module 40, a plurality of LED string lights 50, a measurement module 60, a constant current supply module 70 and an energy storage component 80.

The rectifier module 10 rectifies an alternating current (AC) from an external input, and supplies power to the energy storage component 80 and the plurality of LED string lights 50; the switch module 20 controls the energy storage component 80 to charge and discharge and a power supply to the plurality of LED string lights 50 through an on-off of itself; the constant current supply module 70 keeps the current of the plurality of LED string lights 50 constant; the measurement module 60 measures a voltage difference between two ends of the constant current supply module 70 before outputting the voltage difference measured to the control module 30; when the voltage difference between two ends of the switch module 20 is less than a first threshold voltage Vth1, and the voltage difference between two ends of the constant current supply module 70 is less than a second threshold voltage Vth2, the switch module 20 will be controlled on, so as to enable the rectifier module 10 to charge the energy storage component 80 and supply power to the plurality of LED string lights 50; when the voltage difference between two ends of the switch module 20 exceeds the first threshold voltage Vth1, or the voltage difference between two ends of the constant current supply module 70 exceeds the second threshold voltage Vth2, the control module 30 will control the switch module 20 off, so as to enable the energy storage component 80 to stop charging, and the energy storage component 80 starts to supply power to the plurality of LED string lights 50.

It may be seen that, the linear constant current LED drive device capable of driving reduced number of LEDs provided by the present invention, may enable a sum of a plurality of VF voltage values of the LEDs in the plurality of LED string lights not have to match a maximum voltage output from the rectifier module 10, and the number of LEDs may be greatly reduced, while maintaining a high driving efficiency. The VF voltage of the LEDs, is a parameter of the LED, called a Forward Voltage, that is, the voltage between two ends of the LED under a certain current.

The linear constant current LED drive device capable of driving reduced number of LEDs provided by the present invention, wherein a plurality of connection methods may be adopted for each module, and a preferred embodiment of the present invention is shown as FIG. 3.

Specifically, the rectifier module 10 is applied to rectifying an external input alternating current (AC), charging the energy storage component 80 and supplying power to the plurality of LED string lights 50. Preferably, the rectifier module 10 is a rectifier bridge.

The energy storage component 80, applied to storing energy, charging and discharging; preferably, the energy storage component 80 comprises a capacitor.

The switch module 20, applied to controlling the energy storage component 80 to charge and discharge; that is, controlling the energy storage component 80 to supply power to the plurality of LED string lights 50, and controlling the energy storage component 80 to be charged by the rectifier module 10.

The constant current supply module 70, applied to keeping the current of the plurality of LED string lights 50 constant.

The measurement module 60, applied to measuring the voltage difference between two ends of the constant current supply module 70, and comparing the voltage difference between two ends of the constant current supply module 70 to the second threshold voltage Vth2, before outputting a comparison result to the control module 30.

The control module 30, applied to measuring the voltage difference between two ends of the switch module 20, and comparing the voltage difference between two ends of the switch module 20 to the first threshold voltage Vth1, when the voltage difference between two ends of the switch module 20 is less than the first threshold voltage Vth1, and the voltage difference between two ends of the constant current supply module 70 is less than the second threshold voltage Vth2, the switch module 20 is controlled on, so as to charge the energy storage component 80; when the voltage difference between two ends of the switch module 20 exceeds the first threshold voltage Vth1, or the voltage difference between two ends of the constant current supply module 70 exceeds the second threshold voltage Vth2, the switch module 20 is controlled off so that the energy storage component 80 supplies power to the plurality of LED string lights 50.

An input end of the rectifier module 10 connects to an external AC (220V), an output end of the rectifier module 10 connects to one end of the energy storage component 80 and a positive electrode of the plurality of LED string lights 50 through the switch module 20; another end of the energy storage component 80 gets grounded, a negative electrode of the plurality of LED string lights 50 connects to an input end of the constant current supply module 70 and a first input end 1 of the measurement module 60, both an output end of the constant current supply module 70 and a second input end 2 of the measurement module 60 get grounded, an output end of the measurement module 60 connects to a control signal input end of the switch module 20 through the control module 30.

The plurality of LED string lights 50 are composed by a plurality of LEDs connected in series.

The unidirectional conduction module 40 is applied to a positive conduction, and preventing the energy storage component 80 from leaking. The switch module 20 connects to one end of the energy storage component 80 and the positive electrode of the plurality of LED string lights 50 through the unidirectional conduction module 40. Specifically, the unidirectional conduction module 40 comprises a diode, and through which the switch module 20 connects to one end of the energy storage component 80 and the positive electrode of the plurality of LED string lights 50.

Further, the control module 30 comprises a level shift unit 310, a switch control unit 320, and a switch voltage measurement unit 330.

The level shift unit 310 is applied to shifting a level of the voltage output by the measurement module 60, so that the voltage output from the measurement module 60 is shifted to a voltage domain of the switch module 20. That is, the voltage output from the measurement module 60 achieves a translation of the voltage domain through the level shift unit 310. The switch module 20 and the control module 30 are applied to controlling to charge the energy storage component 80, and have to be connected between the positive output of the rectifier module 10 and the energy storage component 80, thus a ground (lowest) level of both the switch module 20 and the control module 30 is almost same to a level on the energy storage component 80. Since the control module 30 may control the switch module 20 according to the output of the measurement module 60, while a reference ground level of both the measurement module 60 and the constant current supply module 70 is a negative output of the rectifier module 10, which is different to that of the switch module 20, thus, it is needed to shift the level of the output from the measurement module 60. Through the level shift unit 310, the control from the control module 30 to the switch module 20 becomes more precisely, and a power supply efficiency to the plurality of LED string lights 50 is further improved.

The switch voltage measurement unit 330 is applied to measuring the voltage difference between two ends of the switch module 20, and comparing the voltage difference between two ends of the switch module 20 to the first threshold voltage Vth1, before outputting a comparison result to the switch control unit 320; a function of the switch voltage measurement unit 330 is as same as that of the measurement module 60, both are applied to measuring the voltage difference and comparing the voltage difference to the threshold voltage, thus a circuit part of each of them may be same, of course, different circuit designs may also be adopted and there are no limits provided by the present invention.

The switch control unit 320 is applied to controlling the switch module 20 on so as to charge the energy storage component 80, when the voltage difference between two ends of the switch module 20 is less than the first threshold voltage Vth1, and the voltage difference between two ends of the constant current supply module 70 is less than the second threshold voltage Vth2; while controlling the switch module 20 off so as to stop charging the energy storage component 80, when the voltage difference between two ends of the switch module 20 exceeds the first threshold voltage Vth1, or the voltage difference between two ends of the constant current supply module 70 exceeds the second threshold voltage Vth2.

Continue referencing to FIG. 3, wherein, a dotted line arrow indicates a state 1 at work, that is, a direction of the current when the switch module 20 is turned on, now an output of the rectifier module 10 passes through the switch module 20 and the unidirectional conduction module 40, before charging the energy storage component 80, at a same time, it further supplies power to the plurality of LED string lights 50, the constant current supply module 70 and the measurement module 60. A solid line arrow indicates a state 2 at work, that is, the direction of the current when the switch module 20 is turned off, now the energy storage component 80 discharges and supplies power to the plurality of LED string lights 50. From FIG. 3, it may be shown that, the linear constant current LED drive device may switch between two work states, when the switch module 20 is on and off.

Figure 4:
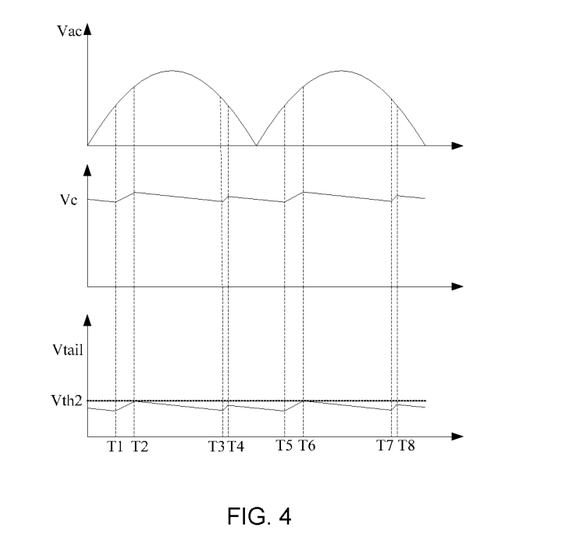
FIG. 4 illustrates a waveform output from the rectifier module, a waveform of the energy storage component and a voltage waveform of the constant current supply module, in the linear constant current LED drive device capable of reducing a number of LEDs provided by the present invention.

Referencing to FIG. 4 together, wherein, from top down, they are a plurality of waveforms during a working process, that is, a waveform (Vac) output from the rectifier module 10 (rectifier bridge), a waveform (Vc) on the energy storage component 80, a waveform of voltage (Vtail) on the constant current supply module 70. And the voltage on the plurality of LED string lights 50 is Vc-Vtail, thus, it may be seen from the waveforms of the Vc and Vtail shown in FIG. 4, the voltage of the plurality of LED string lights 50 are maintaining unchanged.

During a time period from T1 to T2, the linear constant current LED drive device is working at the state 1. The voltage on the constant current supply module 70 is less than the second threshold voltage Vth2 preset, and the voltage difference between two ends of the switch module 20 is less than the first threshold voltage Vth1 preset, the switch module 20 is turned on, and the rectifier bridge outputs to charge the energy storage component 80. At a time of T2, the voltage on the constant current supply module 70 reaches the second threshold voltage Vth2 preset, the switch module 20 is turned off to stop charging the energy storage component 80.

Wherein, the first threshold voltage Vth1 is set according to a requirement of the real circuit, preferably, it is selected as the highest voltage that two ends of real circuit may afford, when the switch module 20 is turned on, which is determined by an over current capacity of the switch, if the voltage between two ends is too high, the current on startup will be overlarge, and a switch tube may be burnt. The second threshold voltage Vth2 limits a highest voltage on the energy storage component 80, and affects directly an efficiency of the system, when the second threshold voltage Vth2 is raised, the efficiency of the system lowers; when the second threshold voltage Vth2 is lowered, the efficiency of the system raises. Preferably, the second threshold voltage Vth2 is set around 30% of that of the plurality of LED string lights 50, so as to ensure the efficiency of the system is around 85%.

During a time period from T2 to T3, the system is working at the state 2. Since the output voltage of the rectifier bridge is rising, the voltage difference between two ends of the switch module 20 exceeds the preset first threshold voltage Vth1, thus the switch module 20 is in an off status. The energy storage component 80 discharges and supplies power to the plurality of LED string lights 50 (a load), and the voltage on the energy storage component 80 keeps lowering.

During a time period from T3 to T4, the system is working at the state 1. The voltage difference between two ends of the switch module 20 is less than the first threshold voltage Vth1 preset, and since the energy storage component 80 is keeping discharging, the voltage difference between two ends of the constant current supply module 70 is less than the second threshold voltage Vth2 preset; the switch module 20 restarts to on, and the rectifier bridge outputs to charge the energy storage component 80.

During a time period from T4 to T5, the system is working at the state 2. The voltage difference between two ends of the energy storage component 80 exceeds the output voltage of the rectifier bridge, the unidirectional conduction module 40 is in an off status. The energy storage component 80 discharges and supplies power to the plurality of LED string lights 50, and the voltage between two ends of the energy storage component 80 keeps decreasing.

During a time period from T5 to T6, it turns back to the time period from T1 to T2, thus will not be repeated here.

Figure 5A:
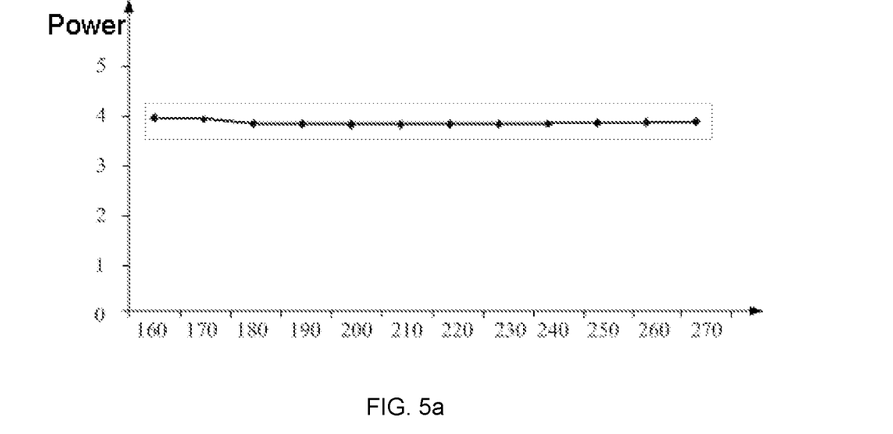
FIG. 5a illustrates a curve showing the power changes following a change of a line voltage, in the linear constant current LED drive device capable of reducing a number of LEDs provided by the present invention.
Figure 5B:
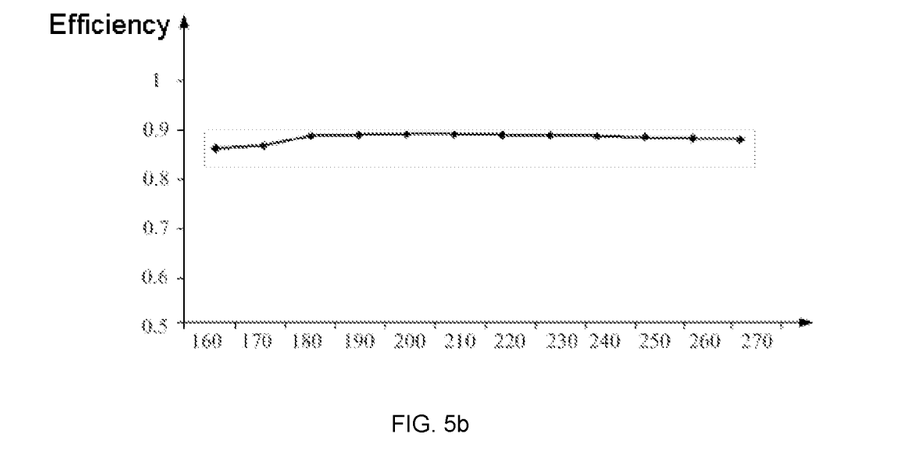
FIG. 5b illustrates a curve showing the efficiency changes following a change of the line voltage in the linear constant current LED drive device capable of driving reduced number of LEDs provided by the present invention.

In the prior arts, an energy storage capacitor is connected to an output end of the rectifier bridge, the voltage on the energy storage capacitor is close to the maximum voltage output from the rectifier bridge, thus, the voltage difference between the sum of the VF values of the plurality of LED string lights and the voltage on the energy storage capacitor may not be too large, otherwise, the efficiency of the system will be very low, and the reliability will be very poor. While the linear constant current LED drive device provided by the present invention, through controlling the energy storage component 80 to charge and discharge, the voltage on the energy storage component 80 will not exceed the sum of the voltage VF values of the plurality of LED string lights, plus the second threshold voltage Vth2, with almost no relationship to the input voltage of the energy storage component 80; when the number of the LEDs in the plurality of LED string lights decreases\increases, the voltage on the energy storage component 80 will also decrease\increase accordingly. Comparing to a conventional protocol, the sum of the VF values of the LEDs in the plurality of LED string lights does not have to match the maximum value of voltages output from the rectifier bridge, thus the number of the LEDs may be reduced greatly, while a pretty high driving efficiency may be kept when the input voltage changes. Shown as FIG. 5, it is a curve illustrating the power and efficiency changes following a change of the line voltage in the linear constant current LED drive device provided by the present invention, when adopting 56 LEDs, wherein, FIG. 5*a* illustrates a curve showing the power changes following the change of the line voltage, and FIG. 5*b* illustrates a curve showing the efficiency changes following the change of the line voltage. It may be seen that, the linear constant current LED drive device provided by the present invention, wherein not only the number of the LEDs in the plurality of LED string lights is not affected by the output of the rectifier bridge, but also owns a very stable power, and a very high and pretty stable efficiency, when the input voltage changes.

Figure 6:
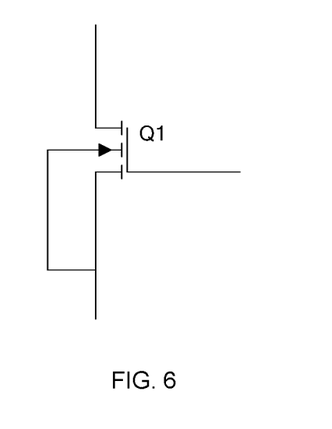
FIG. 6 illustrates a circuit diagram of the switch module in the linear constant current LED drive device capable of driving reduced number of LEDs provided by the present invention.

Further, referencing to FIG. 6, the switch module 20 comprises a first MOS transistor Q1, whose drain electrode connects to the output end of the rectifier module 10, whose source electrode connects to the positive electrode of the unidirectional conduction module 40, and whose gate electrode is the control signal input end of the switch module 20, connecting to the switch control unit 320.

Figure 7:
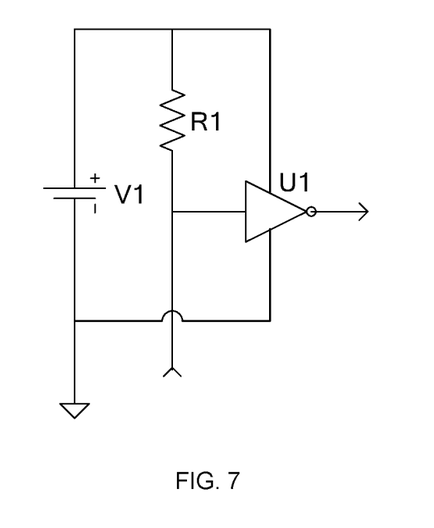
FIG. 7 illustrates a circuit diagram of the level shift unit in the linear constant current LED drive device capable of driving reduced number of LEDs provided by the present invention.

Referencing to FIG. 7, the level shift unit 310 comprises a power supply V1, a first resistor R1 and an inverter U1; a negative electrode of the power supply V1 gets grounded, a positive electrode of the power supply V1 connects to one end of the first resistor R1 and a positive end of a power supply of the inverter U1, another end of the first resistor R1 is an input end of the level shift unit 310, connecting to an output end of the measurement module 60 and an input end of the inverter U1, a negative end of the power supply of the inverter U1 gets grounded, and an output end of the inverter U1 is an output end of the level shift unit 310, connecting to the gate electrode of the first MOS transistor Q1. Through the power supply V1, the first resistor R1 and the inverter U1, it may achieve a translation of the voltage domain for the voltage output from the measurement unit 60, which is very practical.

Figure 8:
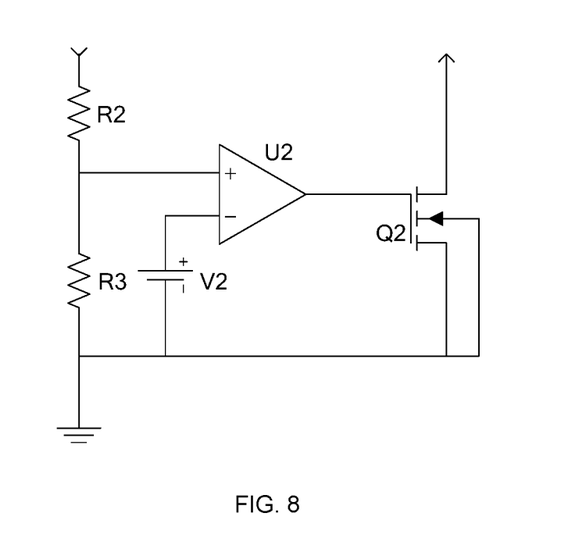
FIG. 8 illustrates a circuit diagram of the measurement module in the linear constant current LED drive device capable of driving reduced number of LEDs provided by the present invention.

Referencing to FIG. 8, the measurement module 60 comprises a second resistor R2, a third resistor R3, a first reference voltage source V2, a second MOS transistor Q2 and a comparator U2; one end of the second resistor R2 is a first input end 1 of the measurement module 60, connecting to an input end of the constant current supply module 70 and a negative electrode of the plurality of LED string lights 50, another end of the second resistor R2 connects to a non-inverting input end of the comparator U2, and further gets grounded through the third resistor R3; a positive electrode of the first reference voltage source V2 connects to an inverting input end of the comparator U2, a negative electrode of the first reference voltage source V2 is a second input end 2 of the measurement module 60, and gets grounded, an output end of the comparator U2 connects to a gate electrode of the second MOS transistor Q2, while a source electrode of the second MOS transistor Q2 gets grounded, and a drain electrode of the second MOS transistor Q2 is an output end of the measurement module 60, connecting to the switch control unit 320.

Figure 9:
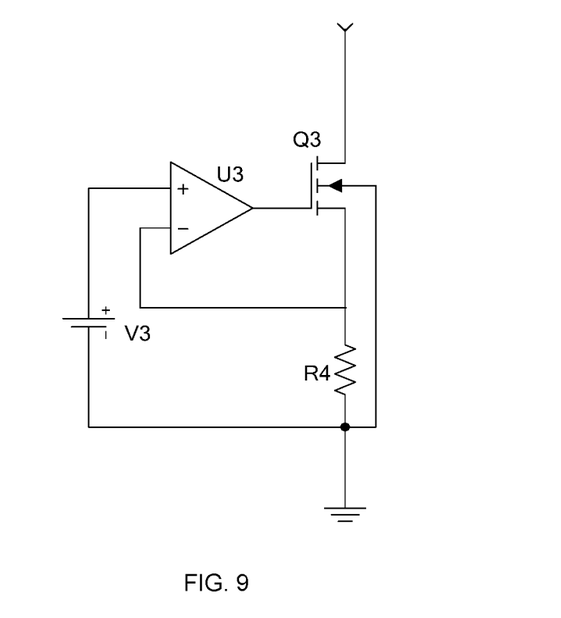
FIG. 9 illustrates a circuit diagram of the constant current supply module in the linear constant current LED drive device capable of driving reduced number of LEDs provided by the present invention.

Referencing to FIG. 9, the constant current supply module 70 comprises a fourth resistor R4, a second reference voltage source V3, a third MOS transistor Q3 and an operational amplifier U3; a drain electrode of the third MOS transistor Q3 is an input end of the constant current supply module 70, connecting to a negative electrode of the plurality of LED string lights 50 outside and one end of the second resistor R2, a source electrode of the third MOS transistor Q3 is connected to an inverting input end of the operational amplifier U3 and gets grounded through the fourth resistor R4, a positive electrode of the second reference voltage source V3 is connected to a non-inverting input end of the operational amplifier U3, while a negative electrode of the second reference voltage source V3 gets grounded.

Figure 10:
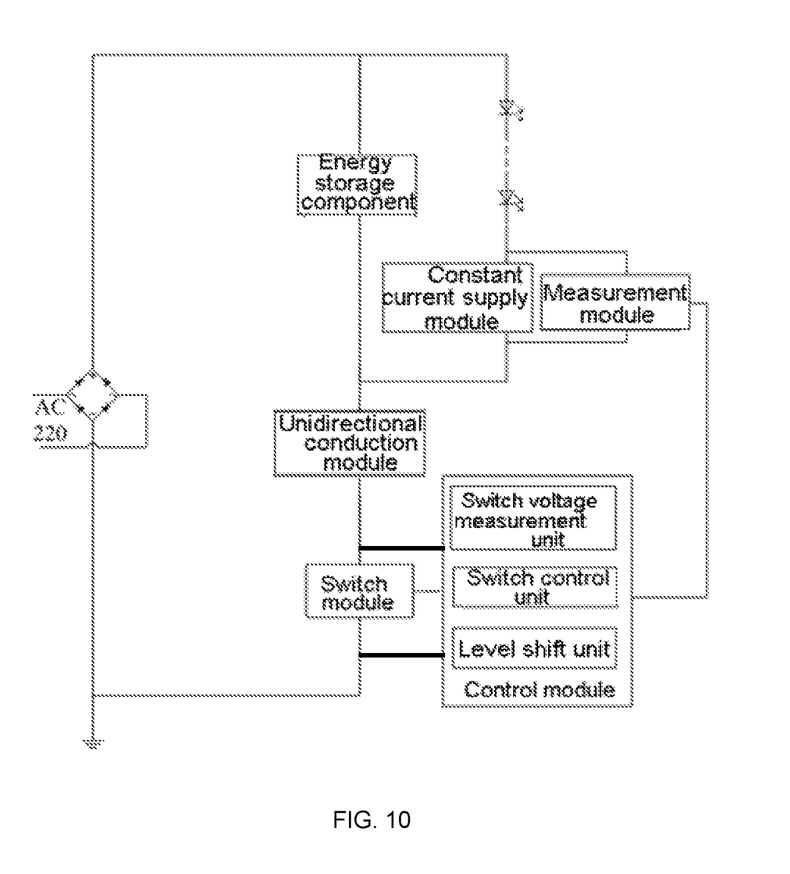
FIG. 10 illustrates a structural block diagram of another embodiment in the linear constant current LED drive device capable of driving reduced number of LEDs provided by the present invention.

In another embodiment of the present invention, a structural block diagram of the linear constant current LED drive device capable of driving reduced number of LEDs is shown as FIG. 10, which has a same principle as that of the previous embodiment, and only a connection method between each module is different, thus will not be repeated here.

Figure 11:
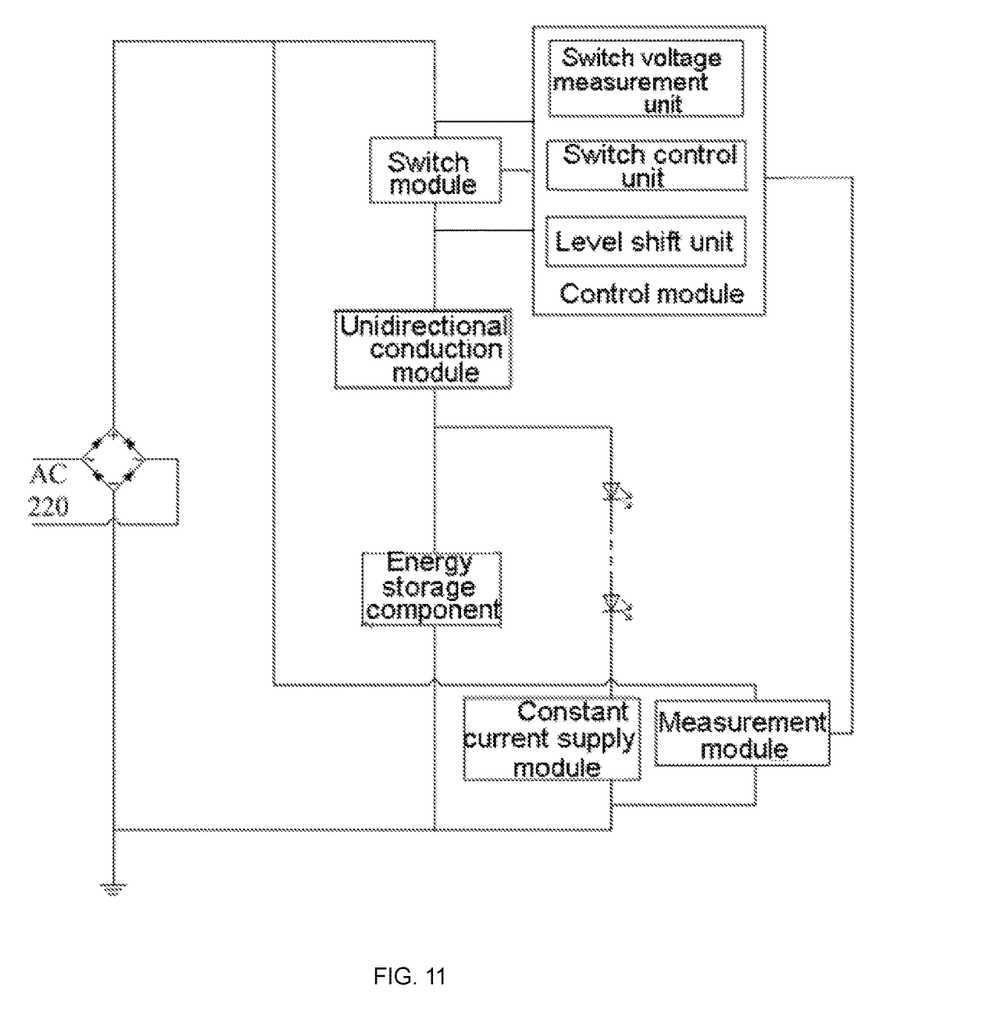
FIG. 11 illustrates a structural block diagram of a third embodiment in the linear constant current LED drive device capable of driving reduced number of LEDs provided by the present invention.

Referencing to FIG. 11, which is a third embodiment provided by the present invention, wherein it is the output voltage of the rectifier bridge that is measured by the measurement module, accordingly, during a process of controlling the switch module, the control module changes the voltage difference between two ends of the constant current supply module in the previous embodiment into the output voltage of the rectifier bridge. That is, the control module is configured to control the switch module on and charge the energy storage component, when the voltage difference between two ends of the switch module is less than the first threshold voltage Vth1, and the output voltage of the rectifier bridge is less than a third threshold voltage Vth3; and control the switch module off to enable the energy storage component to supply power to the plurality of LED string lights, when the voltage difference between two ends of the switch module exceeds the first threshold voltage Vth1, or the output voltage of the rectifier bridge exceeds the third threshold voltage Vth3. The third threshold voltage Vth3 may be set as needed. Since other work principles of the embodiment shown in FIG. 11 are as same as that in the previous embodiment, thus they will not be repeated here.

It should be understood that the above embodiments disclosed herein are exemplary only and not limiting the scope of this disclosure. Without departing from the spirit and scope of this invention, other modifications, equivalents, or improvements to the disclosed embodiments are obvious to those skilled in the art and are intended to be encompassed within the scope of the present disclosure.

What is claimed is:

1. A linear constant current LED drive device capable of driving reduced number of LEDs, wherein comprises a rectifier module, an energy storage component, a switch module, a constant current supply module, a measurement module and a control module;

the rectifier module rectifies an alternating current (AC) from an external input, and supplies power to both the energy storage component and a plurality of LED string lights; the switch module controls the energy storage component to charge and discharge and a power supply to the plurality of LED string lights through an on-off of the switch module; the constant current supply module keeps the current of the plurality of LED string lights constant; the measurement module measures a voltage difference between two ends of the constant current supply module before outputting the voltage difference measured to the control module; when the voltage difference between two ends of the switch module is less than a first threshold voltage, and the voltage difference between two ends of the constant current supply module is less than a second threshold voltage, the switch module will be controlled on, so as to enable the rectifier module to charge the energy storage component and supply power to the plurality of LED string lights; when the voltage difference between two ends of the switch module exceeds the first threshold voltage, or the voltage difference between two ends of the constant current supply module exceeds the second threshold voltage, the switch module is controlled off so as to enable the energy storage component to supply power to the plurality of LED string lights.

2. The linear constant current LED drive device capable of driving reduced number of LEDs according to claim 1, wherein the first threshold voltage is a highest voltage it may afford between two ends thereof, when the switch module is turned on.

3. The linear constant current LED drive device capable of driving reduced number of LEDs according to claim 1, wherein the control module comprises:
  a level shift unit, applied to shifting a level of the voltage output by the measurement module, so that the voltage output from the measurement module is shifted to a voltage domain of the switch module;
  a switch voltage measurement unit, applied to measuring the voltage difference between two ends of the switch module, and comparing the voltage difference between two ends of the switch module to the first threshold voltage;
  a switch control unit, applied to controlling the switch module on so as to charge the energy storage component, when the voltage difference between two ends of the switch module is less than the first threshold voltage, and the voltage difference between two ends of the constant current supply module is less than the second threshold voltage; while controlling the switch module off so as to stop charging the energy storage component, when the voltage difference between two ends of the switch module exceeds the first threshold voltage, or the voltage difference between two ends of the constant current supply module exceeds the second threshold voltage.

4. The linear constant current LED drive device capable of driving reduced number of LEDs according to claim 3, wherein the drive device further comprises a unidirectional conduction module, applied to a forward direction conduction to preventing a leakage of the energy storage component; the switch module connects to one end of the energy storage component and a positive electrode of the plurality of LED string lights through the unidirectional conduction module.

5. The linear constant current LED drive device capable of driving reduced number of LEDs according to claim 4, wherein the switch module comprises a first MOS transistor, a drain electrode of the first MOS transistor connects to an output end of the rectifier module, a source electrode of the first MOS transistor connects to a positive electrode of the unidirectional conduction module, a gate electrode of the first MOS transistor is an input end for a control signal of the switch module, connecting to the switch control unit.

6. The linear constant current LED drive device capable of driving reduced number of LEDs according to claim 5, wherein the level shift unit comprises a power supply, a first resistor and an inverter; a negative electrode of the power supply gets grounded, a positive electrode of the power supply connects to one end of the first resistor and a positive end of a power supply of the inverter, another end of the first resistor is an input end of the level shift unit, connecting to an output end of the measurement module and an input end of the inverter, a negative end of the power supply of the inverter gets grounded, and an output end of the inverter is an output end of the level shift unit, connecting to the gate electrode of the first MOS transistor.

7. The linear constant current LED drive device capable of driving reduced number of LEDs according to claim 3, wherein the measurement module comprises a second resistor, a third resistor, a first reference voltage source, a second MOS transistor and a comparator; one end of the second resistor is an input end of the measurement module, connecting to an input end of the constant current supply module and a negative electrode of the plurality of LED string lights, another end of the second resistor connects to an non-inverting input end of the comparator, and further gets grounded through the third resistor; a positive electrode of the first reference voltage source connects to an inverting input end of the comparator, a negative electrode of the first reference voltage source gets grounded, an output end of the comparator connects to a gate electrode of the second MOS transistor, while a source electrode of the second MOS transistor gets grounded, and a drain electrode of the second MOS transistor is an output end of the measurement module, connecting to the switch control unit.

8. The linear constant current LED drive device capable of driving reduced number of LEDs according to claim 7, wherein the constant current supply module comprises a fourth resistor, a second reference voltage source, a third MOS transistor and an operational amplifier; a drain electrode of the third MOS transistor is the input end of the constant current supply module, connecting to a negative electrode of the plurality of LED string lights outside and one end of the second resistor, a source electrode of the third MOS transistor is connected to an inverting input end of the operational amplifier and gets grounded through the fourth resistor, a positive electrode of the second reference voltage source is connected to an non-inverting input end of the operational amplifier, while a negative electrode of the second reference voltage source gets grounded.

9. The linear constant current LED drive device capable of driving reduced number of LEDs according to claim 1, wherein the energy storage component comprises a capacitor.

10. The linear constant current LED drive device capable of driving reduced number of LEDs according to claim 4, wherein the unidirectional conduction module includes a diode, the switch module connects to one end of the energy storage component and the positive electrode of the plurality of LED string lights through the diode.

* * * * *